United States Patent
Boyer

[11] Patent Number: 6,112,765
[45] Date of Patent: Sep. 5, 2000

[54] METHOD AND APPARATUS FOR MONITORING OPERATION OF A GASEOUS FUEL ADMISSION VALVE

[75] Inventor: Gary N. Boyer, Lafayette, Ind.

[73] Assignee: Caterpillar Inc., Peoria, Ill.

[21] Appl. No.: 09/084,943

[22] Filed: May 26, 1998

[51] Int. Cl.$^7$ ............................ F16K 37/00; F02M 51/00
[52] U.S. Cl. ................... 137/554; 251/129.16; 73/119 A
[58] Field of Search ....................... 137/554; 251/129.16; 73/119 A

[56] References Cited

U.S. PATENT DOCUMENTS

| | | | |
|---|---|---|---|
| 2,393,482 | 1/1946 | Smith | 137/554 X |
| 3,960,124 | 6/1976 | Payne | 137/554 X |
| 3,993,247 | 11/1976 | Tyler | 137/554 X |
| 4,043,351 | 8/1977 | Durling | 137/554 |
| 4,111,178 | 9/1978 | Casey | 137/554 X |
| 4,142,973 | 3/1979 | Kachman | 137/554 X |
| 4,183,467 | 1/1980 | Sheraton et al. | 137/554 X |
| 4,223,692 | 9/1980 | Perry | 137/554 X |
| 4,341,241 | 7/1982 | Baker | 137/554 |
| 4,350,176 | 9/1982 | Lace | 137/554 X |
| 4,597,364 | 7/1986 | Young | 123/27 GE |
| 4,641,625 | 2/1987 | Smith | 123/575 |
| 4,784,178 | 11/1988 | Kasaya et al. | 137/554 |
| 4,955,326 | 9/1990 | Helmich | 123/27 GE |
| 5,136,986 | 8/1992 | Jensen | 123/27 GE |
| 5,140,959 | 8/1992 | Durbin | 123/304 |
| 5,143,118 | 9/1992 | Sule | 137/554 |
| 5,150,685 | 9/1992 | Porter et al. | 123/478 |
| 5,224,457 | 7/1993 | Arsenault et al. | 123/526 |
| 5,226,396 | 7/1993 | Bailey | 123/494 |
| 5,398,724 | 3/1995 | Vars et al. | 137/625.33 |
| 5,450,829 | 9/1995 | Beck | 123/435 |
| 5,487,372 | 1/1996 | Iida et al. | 123/585 |
| 5,526,786 | 6/1996 | Beck et al. | 123/357 |
| 5,528,928 | 6/1996 | Baker et al. | 73/116 |
| 5,617,337 | 4/1997 | Eidler et al. | 364/551.01 |
| 5,666,924 | 9/1997 | Kadota | 123/520 |

Primary Examiner—John Rivell
Attorney, Agent, or Firm—Samuel Digirolamo

[57] ABSTRACT

In one embodiment of the present invention a method for monitoring operation of a solenoid actuated gaseous fuel admission valve is provided by measuring the resistance across a movable metering plate and a stationary plate in the valve. The plates are constructed with electro-conductive material and the plates comprise a variable resistor. The resistance value across the plates changes as a function as to whether the plates are contacting, not contacting, or there is contamination between them. A converter circuit produces a resistive signal that is indicative of the resistance value of the variable resistor. Processing means receives the resistive signal and responsively determines whether the valve is operating within predetermined performance parameters. A signal may be produced to drive an indicator to show whether the valve is functioning properly.

5 Claims, 4 Drawing Sheets

METHOD AND APPARATUS FOR MONITORING OPERATION OF A GASEOUS FUEL ADMISSION VALVE

TECHNICAL FIELD

This invention relates generally to dual fuel engines, and more particularly, to a method and apparatus for utilizing a movable plate and a stationary plate of a gaseous fuel admission valve as a variable resistor to monitor operation of the valve.

BACKGROUND ART

There are many types of systems in which solenoid actuated valves are utilized. Solenoid actuated valves, such as that described in U.S. Pat. No. 5,398,724, are particularly well suited for use in controlling the delivery of gaseous fluids in engine applications. For example, such a valve can be placed between a gaseous fuel inlet region and an air intake region of a spark ignited internal combustion engine or dual fuel engine.

A dual fuel engine can typically operate in two modes. In a strictly liquid fuel mode a liquid fuel, such as diesel fuel, is injected directly into an engine cylinder or a precombustion chamber as the sole source of energy during combustion. In a dual fuel mode a gaseous fuel, such as natural gas, is mixed with air in an intake port of a cylinder and a small amount of diesel fuel is injected into the cylinder or the precombustion chamber in order to ignite the mixture of air and gaseous fuel.

Regardless of the application in which such solenoid-actuated valves are utilized, it is sometimes possible for such valves to malfunction. For example, a solenoid actuated valve typically includes a movable plate and a stationary plate or seat. If particulate impurities in the fuel get trapped between the movable plate and the stationary plate, the plates will be unable to move close enough together to prevent unintended fuel flow. Other types of impurities may cling to the moving components of the valve, thereby slowing movement of the plates. Further, in some cases an air pressure differential across the valve may become great enough to impede or prevent opening and closing of the valve. In many applications, such as in engine applications, it is desirable to know when problems such as these exist.

Automatic feedback and control systems for engines often include inductive or potentiometric sensors connected to a control unit to detect measurable quantities. Such measurable quantities include, for example, the position of the throttle control of an engine, the position of the control rod of a diesel injection pump, or the position of an accelerator pedal. During the operational life of the device being monitored, drift effects, due to mechanical wear of the control unit (including any associated limit stops) or contact resistance in the connecting lines leading to the control unit, for example, can corrupt the measured values. Reducing the influences of such effects often entails costly construction or regular servicing and adjustment of such sensors.

Prior systems provide indirect means for diagnosing a faulty or frozen fuel admission valve. U.S. Pat. No. 5,487,372 discloses a fuel system apparatus for detecting deterioration of the response of an air control valve by measuring air pressure at the upstream and the downstream sides of an air control valve disposed in an air passage. U.S. Pat. No. 5,666,924 discloses a device for diagnosing a malfunction of a gas-processing device including a valve, a misfire detector, and an $O_2$ sensor. The device monitors pressures in a fuel tank when the valve is opened and closed along with changes in the air/fuel ratio to determine when a malfunction occurs. U.S. Pat. No. 5,617,337 issued to Eidler et al. teaches a method and device for monitoring the functions of a sensor to determine whether the sensor is operating within predetermined tolerances during various operating states of an internal combustion engine. The method and device disclosed in the Eidler et al. patent require storing a measured value as a reference value when one of a specified operating states exists at a first time and comparing subsequent values. One of the specified states must include a control mechanism being positioned at an end limit stop of a control mechanism. Thus the Eidler et al. method and device are not usable in situations where an end limit stop is not reached.

When quantities that indirectly indicate the position of the valve are used to monitor operation of the valve, there is a risk of misdiagnosing the cause of the problem. For example, a fully functional valve may be replaced if exhaust temperature is used to diagnose a faulty or frozen valve since there are no means to determine whether the deviation in temperature is due to a faulty valve or some other problem. None of the foregoing devices disclose means for directly measuring the position of the valve in a solenoid gaseous fuel admission valve to determine whether the valve is operating properly.

Accordingly, the present invention is directed to overcoming one or more of the problems as set forth above.

DISCLOSURE OF THE INVENTION

In one embodiment of the present invention a method for monitoring operation of a solenoid actuated gaseous fuel admission valve is provided by measuring the electrical resistance of a circuit comprised of a movable fuel metering plate and a stationary plate in the valve. The plates are constructed with electro-conductive material and the plates comprise a variable resistor. As the movable plate moves away from the stationary plate, fuel flows between the plates and the plates are not contacting producing an open circuit. As the valve closes and the two clean plates make contact, a resistance can be measured. A converter circuit produces the resistance of the circuit. Processing means receives the resistive signal and responsively determines whether the valve is operating within predetermined performance parameters. A signal may be produced to drive an indicator to show whether the valve is functioning properly.

BEST MODE FOR CARRYING OUT THE INVENTION

The present invention provides a method and apparatus for monitoring the operation of a gaseous fuel admission valve using the components of the valve as a sensing apparatus. Although the present invention is discussed with relation to an internal combustion engine, it will be apparent to those skilled in the art that the present invention may equally be utilized in conjunction with other types of machinery wherein fuel admission valves are utilized.

Figure 1:
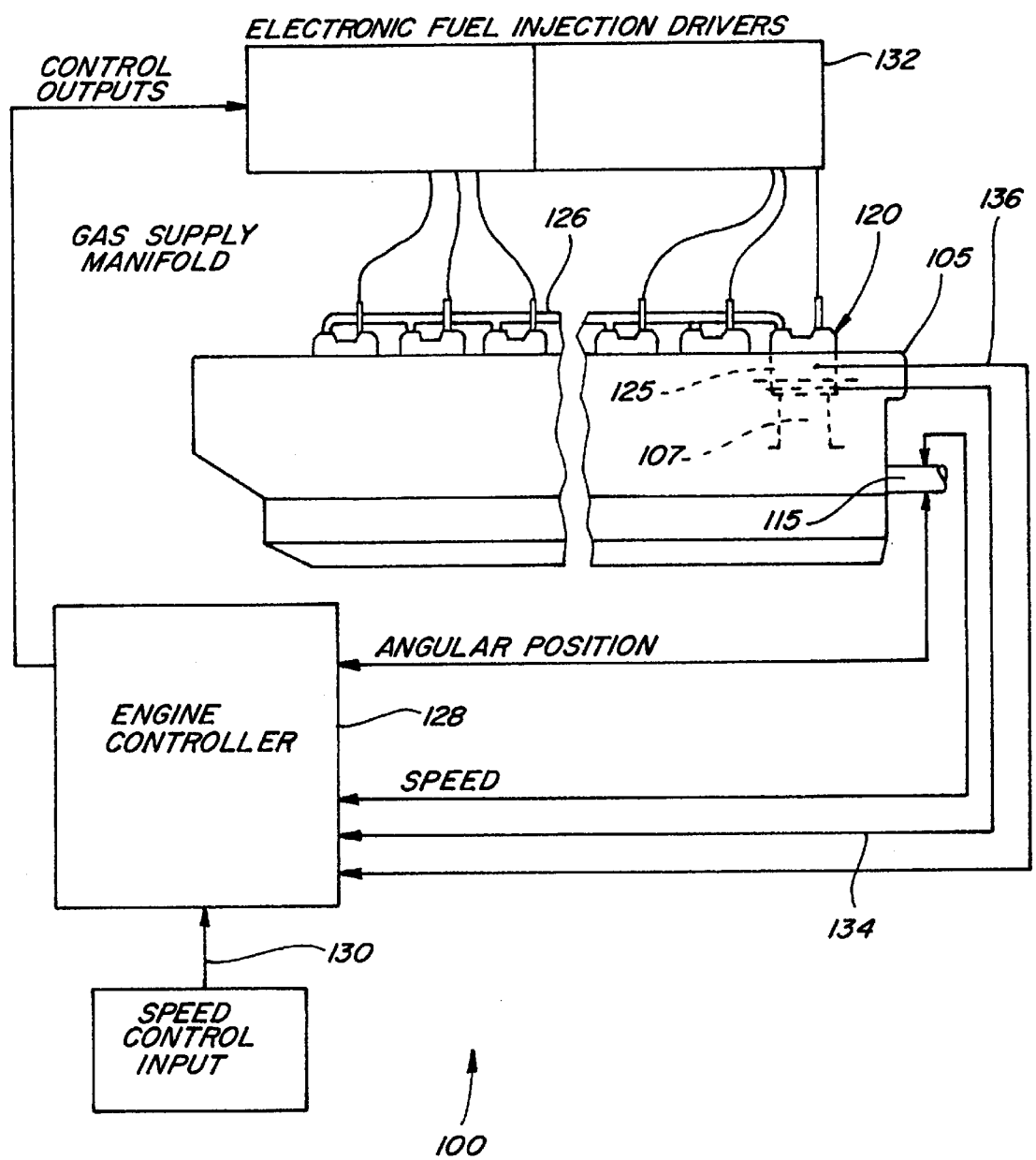
FIG. 1 shows a diagrammatic view of an internal combustion engine.

Referring to the drawings, FIG. 1 illustrates an internal combustion engine system 100. The engine system 100 includes a housing 105 having a plurality of engine cylinders 107. Disposed in each cylinder 107 is a piston (not shown) that is connected to a crankshaft 115. The engine housing 105 additionally includes a cylinder head 120 that holds a solenoid gaseous fuel admission valve 125, an exhaust valve (not shown), and a fuel injector (not shown). To reach the combustion cylinders 107, gaseous fuel must pass from a gas supply manifold 126 through the gaseous fuel admission valve 125. The gaseous fuel is mixed with a flowing stream of air and admitted into the cylinder 107. The angular position and rotational speed of the crankshaft 115 are input to an engine controller 128. Speed control commands 130 are also input to the engine controller 128 and are used to determine the difference between the commanded and actual speed of the engine. The engine controller 128 outputs commands to electronic fuel injection drivers 132 to control the amount of fuel delivered to the engine depending on whether engine speed is decreasing or increasing. In the present invention, electrical contacts 134, 136 with leads are mounted to components of the valve 125 as discussed hereinbelow. The signals from the contacts 134, 136 are input to the engine controller 128 or some other data processing device for monitoring operation of the gaseous fuel admission valves 125. The engine controller 128 is also capable of generating diagnostic information to a diagnostic indicator (not shown) to provide operating status and information about the engine system 100, including the gaseous fuel admission valve 125.

Figure 2:
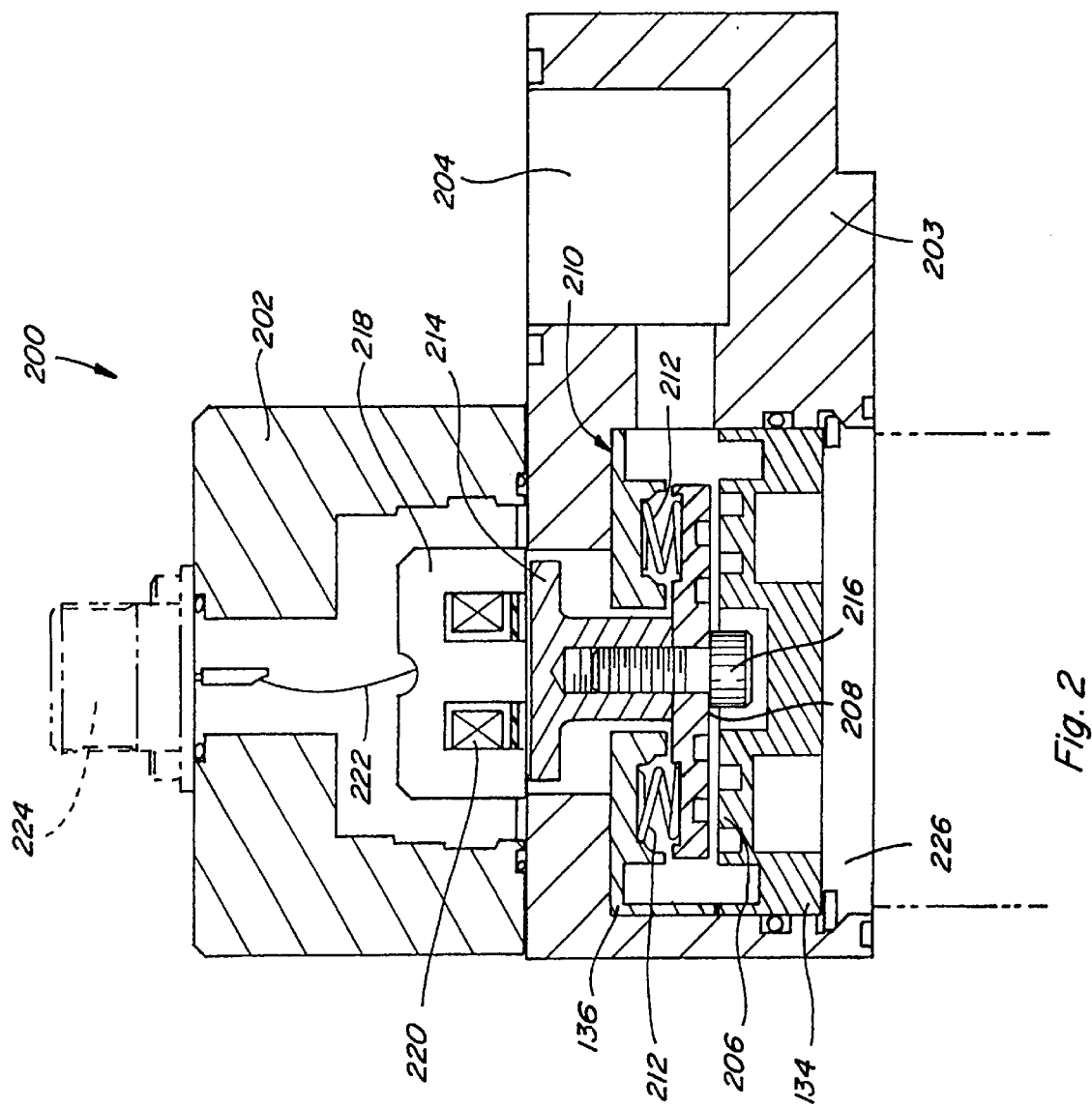
FIG. 2 shows a solenoid actuated gaseous fuel admission valve according to the present invention.

FIG. 2 shows a solenoid actuated gaseous fuel admission valve assembly 200 as shown and described in U.S. Pat. No. 5,398,724, and which is suitable for use in the engine 100 shown in FIG. 1. The valve assembly 200 includes an E-core housing 202 and a valve assembly housing 203 including a gaseous fuel inlet port 204. The valve assembly includes a stationary plate 206, a movable plate 208, a spring seat structure 210, springs 212, a low-mass armature 214, and a screw 216 securing the movable plate 208 to the low-mass armature 214. Positioned within E-core housing 202 is an E-core 218 including a solenoid coil 220 wound thereon. The solenoid coil 220 is connected via wires 222 to an electrical connector 224 which may be mounted on the E-core housing 202.

The valve assembly 200 is normally kept in a closed state by springs 212 holding a lower surface of movable plate 208 against an upper surface of stationary plate 206. The two surfaces are configured with a staggered, nested porting structure to provide a sealed relationship when the plates 206, 208 are positioned against one another, and to allow high fuel flow with only a small separation between the plates 206, 208. A top surface of the movable plate 208 is spaced from the spring seat structure to allow upward movement of the movable plate 208. Similarly, an upper surface of low-mass armature 214 is spaced from the bottom of E-core 218 to allow upward movement of the low-mass armature 214. When an actuating current is delivered to coil 220, the low mass armature 214 is pulled upward toward the E-core 218 and, being attached thereto, movable plate 208 is similarly pulled upward. When pulled upward, the bottom surface of movable plate 208 moves out of its sealed relationship with respect to the top surface of stationary plate 206, allowing gaseous fuel to flow from inlet port 204, through openings in the stationary plate 206, and out a gaseous fuel outlet 226.

Advantageously, the present invention provides a non-contacting sensing apparatus that monitors a variable resistive circuit formed by the movable plate 208 and the stationary plate 206. In order to achieve the proper electrical circuit, the stationary plate 206 must be electrically insulated from the rest of the gaseous fuel admission valve 200. The electrical insulation may be applied in any fashion that allows an electrical charge to be applied to the movable plate 208 without affecting the electrical charge of the stationary plate 206 when the two plates are separated during a valve open condition. The important aspect of the insulation is to electrically isolate the plates 206, 208 from one another when the plates are not contacting.

Electrical contacts 134, 136 with conductive wire leads are mounted to detect the electrical resistance across the stationary plate 206 and the movable plate 208. Accordingly, electrical contact 136 may be mounted to any valve component that carries the same electrical potential as movable plate 208, such as the spring seat structure 210. Electrical contact 134 is mounted to the stationary plate 206.

The signals are conditioned for input to a data processor associated with the electronic fuel injection controller (shown in FIG. 1) to determine the electric potential between the movable plate 208 and the spring seat structure 210.

Figure 3:
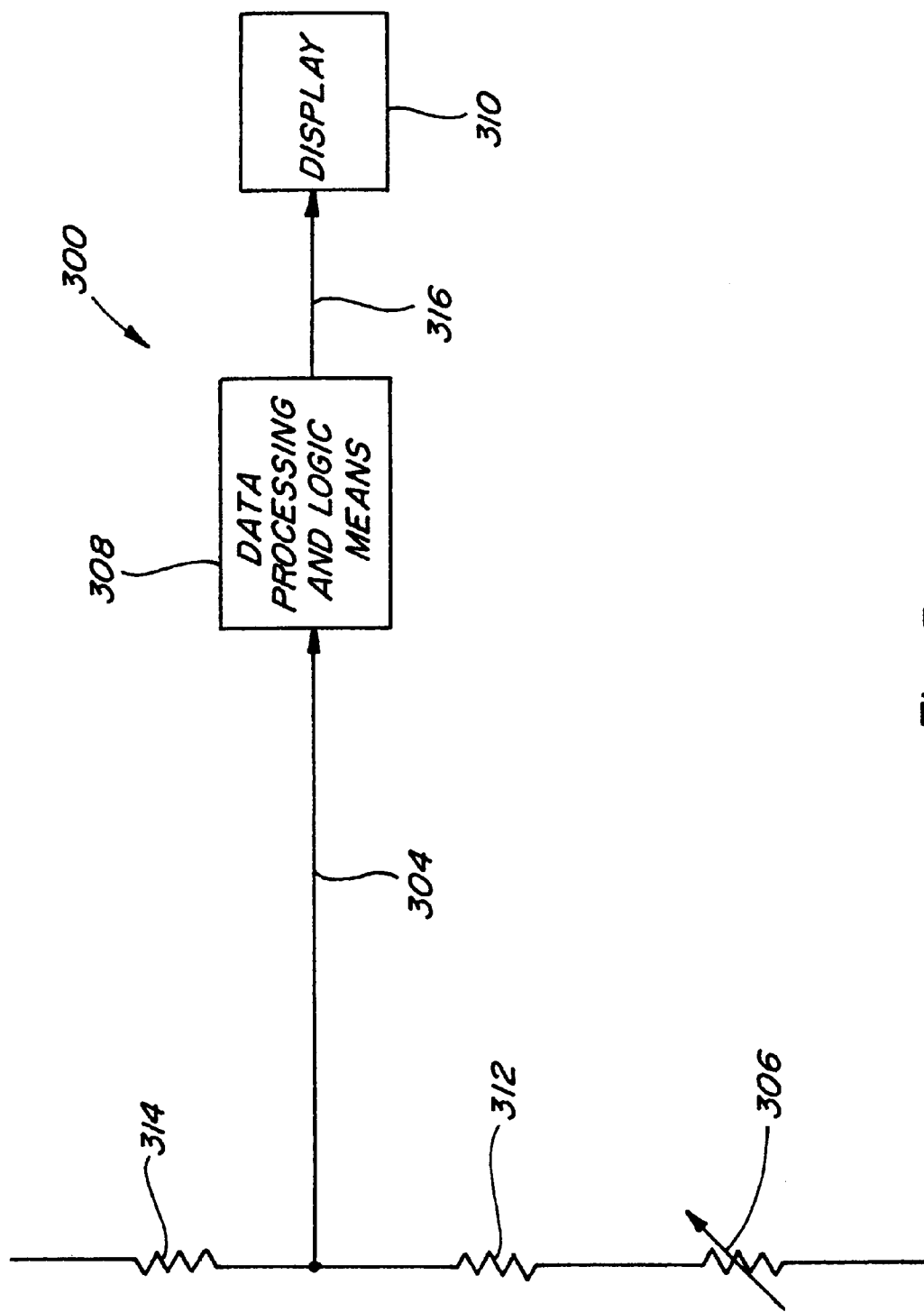
FIG. 3 shows a block diagram of components that may be associated with the present invention.

Thus, valve operation can be evaluated by monitoring the resistance associated with the plates 206, 208. Means for monitoring the resistance can be embodied using any of numerous devices that are well known in the art. FIG. 3 shows an example of resistance monitoring means 300 that includes a resistive signal 304 responsive to the variable resistor 306 created with the plates 206, 208. The resistive signal 304 is delivered to data processing and logic means 308 such as a microprocessor running application-specific software that uses the resistive signal 304 to calculate performance-related parameters. Utilizing a variety of types of data processing and logic means running application-specific software to measure potential across particular components in an electrical circuit is common and well known to those skilled in the art. When connected as shown in FIG. 3, data processing and logic means 308 can determine the value of potential across the plates in valve 125 by measuring the value of resistive signal 304 relative to an electrical ground. The value of voltage supplied to valve 125 from a voltage source and the value of fixed value resistors 312 and 314 in the circuit will be known, and therefore may be pre-programmed into data processing and logic means 308. The voltage source may be any one of a variety of voltage sources commonly utilized in the art such as a battery or a generator, and will typically be the battery of the particular machine or engine. Accordingly, the value of resistive signal 304 shall yield the resistive value of variable resistor 306 in the circuit of FIG. 3 at any given time because the values of all other components in the circuit would be known, whereby data processing and logic means 308 may compare such resistive value to benchmark data stored in the data storage means associated with data processing and logic means 308 and generate appropriate performance-related parameters or signals 316. The performance-related parameters or signals 316 may be delivered to a display means 310 that provides a visual or audio signal to alert the operator if one or more performance-related parameters is outside tolerance. The display means 310 may be a gage, a light or series of flashing, steady, and/or colored lights, a graphics display, a bell, a siren, or any other type of audio or visual device that is capable of providing an appropriate indication of the operation of one or more of the valves 314.

Industrial Applicability

Although the present invention has been described with specific reference to the solenoid valve assembly of FIG. 2, there exist numerous solenoid gaseous fuel admission valve constructions to which the present invention is equally applicable. The terminology "solenoid gaseous fuel admission valve" is intended to cover all such constructions.

The present invention provides means for determining the status of moving plate 208 during the operational cycle of the solenoid gaseous fuel admission valve. The data processing and logic means 308 may include data storage means for storing benchmark data pertaining to the operation of the valve during test conditions as well as data recorded during actual operating conditions. The data processing and logic means 308 may be used to compare the status of movable plate 208 and potential contaminants during various portions of each cycle with stored benchmark data of resistance across plates 206 and 208 at the same portions of each cycle. As described hereinabove, the resistance value of the plates 206 and 208 is related to the status of the movable plate and possible contamination between plates 206 and 208. Logic associated with supplying voltage to the solenoid coil 220 may be used to determine when the resistance between the plates should be at their maximum and minimum values. Similarly, times associated with maximum and minimum fuel flow values may be measured and used to determine whether the distance between the plates was at or near the maximum and minimum values compared to benchmark data.

Figure 4:
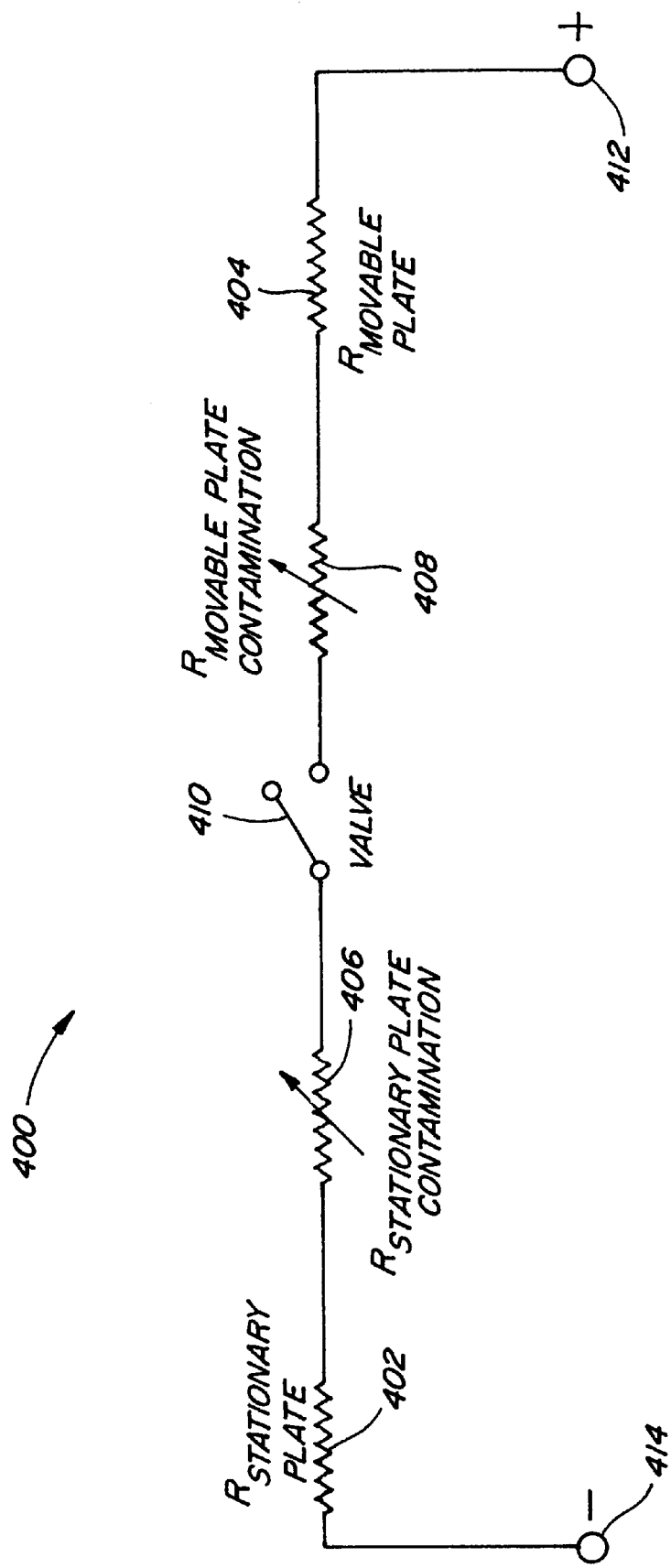
FIG. 4 shows an electrical circuit representation of the solenoid actuated gaseous fuel admission valve of FIG. 2 including representation of any contamination between the stationary and movable plates.

In one embodiment of the present invention, FIG. 4 shows an electrical circuit representation of how valve plates 206 and 208 of solenoid actuated gaseous fuel admission valve 125 and any contamination between plates 206 and 208, which contamination is typically at least partially conductive, act as a variable resistor in an electrical circuit 400. Those skilled in the art will appreciate that circuit 400 in FIG. 4 is equivalent to variable resistor 306 in FIG. 3 which, in turn, is equivalent to an electrical representation of the fuel admission valve 125. Each plate 206 and 208 shall have a predeterminable fixed resistance value and is therefore represented in electrical circuit 400 as fixed value resistors 402 and 404 respectively. Contamination on stationary plate 206, if any, shall inherently create a resistance to the flow of current from stationary plate 206 to movable plate 208 because the contamination will typically exist on the surface of plate 206 and obstruct substantial direct contact between the conductive surface of plate 206 and the conductive surface of plate 208. Because the amount of contamination on the surface of stationary plate 206 shall typically vary, the electrical resistance posed by such contamination shall also vary. Therefore, the contamination may be represented as a variable resistor 406 in series with stationary plate 206 which is represented by fixed value resistor 402. In the event that no contamination exists on the surface of stationary plate 206, the value of variable resistor 406 in circuit 400 shall simply be zero.

Similarly, contamination on the surface of movable plate 208, if any, shall inherently create a resistance to the flow of current from stationary plate 206 to movable plate 208 because the contamination will again typically exist on the surface of plate 208 and obstruct substantial direct contact between the conductive surface of plate 206 and the conductive surface of plate 208. Because the amount of contamination on the surface of movable plate 208 shall also typically vary, the electrical resistance posed by such contamination shall also vary. Therefore, the contamination may be represented as a variable resistor 408 in series with movable plate 208 which is represented by fixed value resistor 404. In the event that no contamination exists on the surface of movable plate 208, the value of variable resistor 408 in circuit 400 shall simply be zero.

When fully closed, valve 125 forms a completed circuit between stationary plate 206, movable plate 208, and any contamination therebetween. On the other hand, when valve 125 is sufficiently open such that there is no contact between stationary plate 206 including any contamination thereon and movable plate 208 including any contamination thereon, the gap between the plates creates an open circuit between stationary plate 206 and any contamination thereon, and movable plate 208 and any contamination thereon. Therefore, such gap between plates 206 and 208 and any contamination associated respectively therewith may be represented in electrical circuit 400 as a switch in series between fixed plate 206 represented by fixed value resistor 402 and any contamination thereon represented by variable resistor 406, and movable plate 208 represented by fixed value resistor 404 and any contamination thereon represented by variable resistor 408. Accordingly, a gap between the plates of valve 125 is represented in circuit 400 as an electrical switch 410.

When valve 125 is closed, data processing and logic means 308 may calculate the resistance value of circuit 400 by the value indicated by signal 304 as discussed above. If the resistance value thus calculated exceeds a predetermined benchmark resistance value for fixed resistors 402 and 404 combined, then the amount of exceeding resistance shall represent the amount of resistance of variable resistors 406 and 408 combined, thereby indicating the presence of contamination on the surface of at least one of plates 206 and 208. Performance-related parameters or signals 316 can thereupon be generated by data processing and logic means 308 based upon the amount of exceeding resistance and tolerance values therefor as pre-programmed in data processing and logic means 308.

Those skilled in the art will appreciate that on occasion when plates 206 and 208 are not fully closed and slightly separated, contamination on the surface of each plate 206 and 208 may still complete circuit 400, and cause current flow from one plate to the other. The range of distance between plates 206 and 208 wherein such phenomenon shall occur will correspond directly to the amount of contamination on both plates 206 and 208 combined. Accordingly, data processing and logic means 308 may be pre-programmed to take such phenomenon into consideration when comparing the resistance of variable resistor 306 to benchmark values when plates 206 and 208 of valve 125 are not fully closed.

Additionally, benchmark data can also be used to compare the time period of each cycle measured under test conditions with the time period of the resistive signal during operation. Tolerances may be used in the data processing and logic means 308 to determine whether a valve is operating properly, and a signal may be generated and sent to the display means 310 if the valve is operating outside the tolerances. The tolerances may be stored in memory or calculated during operation based on other operational parameters and variables.

Although the above has been described with respect to a single solenoid gaseous fuel admission valve, the present invention may be used to determine the operating status of multiple valves.

Other aspects, objects and advantages of the present invention can be obtained from a study of the drawings, the disclosure and the appended claims.

What is claimed is:

1. An apparatus for determining whether a solenoid gaseous fuel admission valve is operating within predetermined performance related parameters when the valve is in a closed position, the valve having an electcally enerizable coil, at least one movable plate, and a second plate, the apparatus comprising:

power means for supplying electrical energy to the coil for moving the at least one movable plate, whereby the valve forms a variable resistor having a resistance value, the resistance value varying as a function of the position of the at least one movable plate relative to said second plate and an amount of contanination between said at least one movable plate and said second plate when the valve is in a closed position;

means for producing a signal indicative of the resistance value of the variable resistor based upon the position of said at least one movable plate relative to said second plate and the amount of contamination between said at least one movable plate and said second plate; and a data processing means operable to compare the resistance value to a benchmark resistance value and to output a signal to display means to indicate whether the resistance value is within a tolerance value.

2. The apparatus as set forth in claim 1 wherein said second plate remains stationary relative to the at least one movable plate.

3. The apparatus as set forth in claim 1 wherein the means for producing a signal indicative of the resistance value of the variable resistor includes a resistor having a known resistance value, a voltage source having a known voltage value, and potential measuring means for measuring the potential across the variable resistor.

4. A method for determining whether a solenoid gaseous fuel admission valve is operating within predetermined performance related parameters when the valve is in a closed position, the valve having an electrically energizable coil, at least one movable plate and another plate, the method comprising the steps of:

supplying electrical energy to the coil for moving the at least one movable plate, whereby the at least one movable plate and the other plate and any contamination therebetween form a variable resistor having a resistance value, the resistance value varying as a function of the position of the movable plate relative to the other plate and the amount of contamination thereberween when the valve is in a closed position;

producing a signal indicative of the resistance value of the variable resistor as the distance between the plates and the amount of contamination therebetween varies;

comparing the resistance value to a benchmark resistance value; and outputting a signal to display means based upon the comparison of the resistance value to the benchmark resistance value if the resistance value is not within a tolerance value.

5. The method as set forth in claim 4 further comprising the step of using a resistor having a known resistance value, a voltage source having a known voltage value, and potential measuring means for measuring the potential on the variable resistor to produce a signal indicative of the resistance value of the variable resistor.

\* \* \* \* \*